United States Patent [19]
Call et al.

[11] Patent Number: 5,848,256
[45] Date of Patent: Dec. 8, 1998

[54] METHOD AND APPARATUS FOR ADDRESS DISAMBIGUATION USING ADDRESS COMPONENT IDENTIFIERS

[75] Inventors: Josef R. Call, Livermore; Michael J. Morrison, Santa Clara, both of Calif.

[73] Assignee: Institute for the Development of Emerging Architectures, L.L.C., Cupertino, Calif.

[21] Appl. No.: 723,271

[22] Filed: Sep. 30, 1996

[51] Int. Cl.⁶ .................................................... G06F 9/38
[52] U.S. Cl. ............................................................ 395/392
[58] Field of Search ................................... 395/392, 393, 395/394, 395

[56] References Cited

U.S. PATENT DOCUMENTS

| | | |
|---|---|---|
| 4,789,925 | 12/1988 | Lahti . |
| 4,807,115 | 2/1989 | Torng . |
| 4,903,196 | 2/1990 | Pomerene et al. . |
| 4,916,652 | 4/1990 | Schwartz et al. ........................ 364/748 |
| 5,185,872 | 2/1993 | Arnold et al. . |
| 5,241,633 | 8/1993 | Nishi . |
| 5,345,569 | 9/1994 | Tran . |
| 5,363,495 | 11/1994 | Fry et al. . |
| 5,465,336 | 11/1995 | Imai et al. ............................... 395/392 |
| 5,467,473 | 11/1995 | Kahle et al. ............................. 395/392 |
| 5,526,499 | 6/1996 | Bernstein et al. ....................... 395/392 |
| 5,615,350 | 3/1997 | Hesson et al. ........................... 395/392 |
| 5,619,662 | 4/1997 | Steely, Jr. et al. ....................... 395/392 |
| 5,625,789 | 4/1997 | Hesson et al. ........................... 395/393 |
| 5,666,506 | 9/1997 | Hesson et al. ........................... 395/392 |
| 5,748,934 | 5/1998 | Lesartre et al. .......................... 395/392 |

OTHER PUBLICATIONS

International Search Report for PCT/US97/12610, Dated Nov. 17, 1997, 2 Pages.
Davidson, Jack W., et al. Improving Instruction–Level parallelism by Loop Unrolling and Dynamic Memory Disambiguation, Proceedings of MICRO–28, IEEE, 1995, pp. 125–132.

*Primary Examiner*—Richard L. Ellis
*Attorney, Agent, or Firm*—Blakely Sokoloff Taylor & Zafman, LLP

[57] ABSTRACT

A scheduling unit is described for scheduling an execution order of a first instruction of a first type and a second instruction of a second type in an instruction stream where the second instruction precedes the first instruction. The scheduling unit comprises a table that records address component identifiers corresponding to the second instruction. An address comparator is coupled to the table. The address comparator compares address component identifiers that corresponds to the first instruction with address component identifiers on the table. The scheduling unit schedules the first instruction to be executed ahead of the second instruction when the address component identifiers differ from the address component identifiers on the table.

19 Claims, 5 Drawing Sheets

| SEGMENT REG. | BASE REG. | DISPLACEMENT |
|---|---|---|
| SS | EAX | 0 |
| DS | EBX | 4 |
| ES | ECX | 2 |
| DS | EAX | 2 |
| ⋮ | ⋮ | ⋮ |
| ⋮ | ⋮ | ⋮ |

METHOD AND APPARATUS FOR ADDRESS DISAMBIGUATION USING ADDRESS COMPONENT IDENTIFIERS

FIELD OF THE INVENTION

The present invention pertains to the field of instruction scheduling. More specifically, the present invention relates to an apparatus and method for re-ordering data-dependent instructions in an instruction stream.

BACKGROUND OF THE INVENTION

One of the primary opportunities for improving performance in modem microprocessors is the dynamic re-ordering of instructions by the machine's scheduling hardware. By re-ordering an instruction stream, a scheduler maximizes the utilization of its execution resources and minimizes program execution time. For example, an instruction that starts a long dependence chain may be moved up in its instruction stream to be executed ahead of its program order. This would allow the data operands in the instruction to be made available at an earlier time and allow other instructions dependent on those data operands to be executed at an earlier time.

For non-memory instructions, the decision of whether to re-order one instruction before another may be made by examining the instructions' data dependencies. The data dependencies of non-memory instructions are expressed explicitly through the instructions' operands. If a first instruction contains operands that are dependent upon the execution of a second instruction, the first instruction cannot be re-ordered above the second instruction. Instead, the first instruction must wait until the second instruction has been executed in order to use the second instruction's operands.

The decision of whether to re-order one memory instruction before another memory instruction, however, may not be made by merely examining the instructions' operands. Memory instructions access locations in memory and thus have additional implicit dependencies that may not be reflected in their operands. For example, if a first memory instruction loading data from a location in memory is re-ordered above a second memory instruction storing data to the same location in memory, a Read-After-Write hazard exists. The first memory instruction would forward stale data back to the processor core, resulting in incorrect program operation. Thus, when a first memory instruction and a second memory instruction touch overlapping memory regions, the first instruction is implicitly dependent upon the second instruction. This problem does not exist in in-order execution machines which do not re-order memory instructions.

In earlier out-of-order scheduling machines, the physical addresses of memory locations accessed by memory instructions were compared. If no overlap was detected, a first instruction was permitted to be re-ordered above a second instruction. By checking the actual addresses in memory that each instruction was accessing, Read-After-Write hazards were avoided. However, obtaining the actual addresses in memory that are accessed may require a large number of cycles when the instruction scheduling hardware is not within close proximity with the registers containing the memory addresses.

Thus, a method is needed for checking data dependencies of memory instructions without incurring a time penalty for comparing the actual physical addresses in memory which are accessed.

SUMMARY OF THE INVENTION

One feature of the present invention is to provide a scheduling unit which is able to determine whether a first memory instruction is dependent on a second memory instruction without comparing the actual memory addresses which are accessed.

Another feature of the present invention is to provide a scheduling unit that predicts the likelihood of dependency between two memory instructions by comparing the address component identifiers of each memory instruction.

An additional feature of the present invention is to provide a backstop mechanism that checks whether a prediction made by the scheduling unit regarding the likelihood of dependency between two memory instructions is correct.

According to one aspect of the invention, a scheduling unit is described for scheduling an execution order of a micro-operation corresponding to a first instruction of a first type and a micro-operation corresponding to a second instruction of a second type in an instruction stream where the second instruction precedes the first instruction. The scheduling unit comprises a table that records address component identifiers of the micro-operation corresponding to the second instruction. A comparator is coupled to the table. The comparator compares address component identifiers of the micro-operation that corresponds to the first instruction with address component identifiers stored in the table. The scheduling unit schedules the micro-operation corresponding to the first instruction to be executed ahead of the micro-operation corresponding to the second instruction when the address component identifiers of the micro-operation corresponding to the first instruction differ from the address component identifiers in the table.

According to another aspect of the invention, a method is described for determining when to execute a micro-operation corresponding to a first instruction of a first type before a micro-operation corresponding to a second instruction of a second type in an instruction stream where the second instruction precedes the first instruction. According to the method, address component identifiers of the micro-operation corresponding to the first instruction are compared with address component identifiers of the micro-operation corresponding to the second instruction. The micro-operation corresponding to the first instruction is executed before the micro-operation corresponding to the second instruction when the address component identifiers of the micro-operation corresponding to the first instruction differ from the address component identifiers of the micro-operation corresponding to the second instruction.

BRIEF DESCRIPTION OF THE DRAWINGS

The present invention is illustrated by way of example and not by way of limitation in the figures of the accompanying drawings, in which like references indicate similar elements and in which:

FIG. 4 illustrates an address disambiguation table according to one embodiment of the present invention;

DETAILED DESCRIPTION

Figure 1:
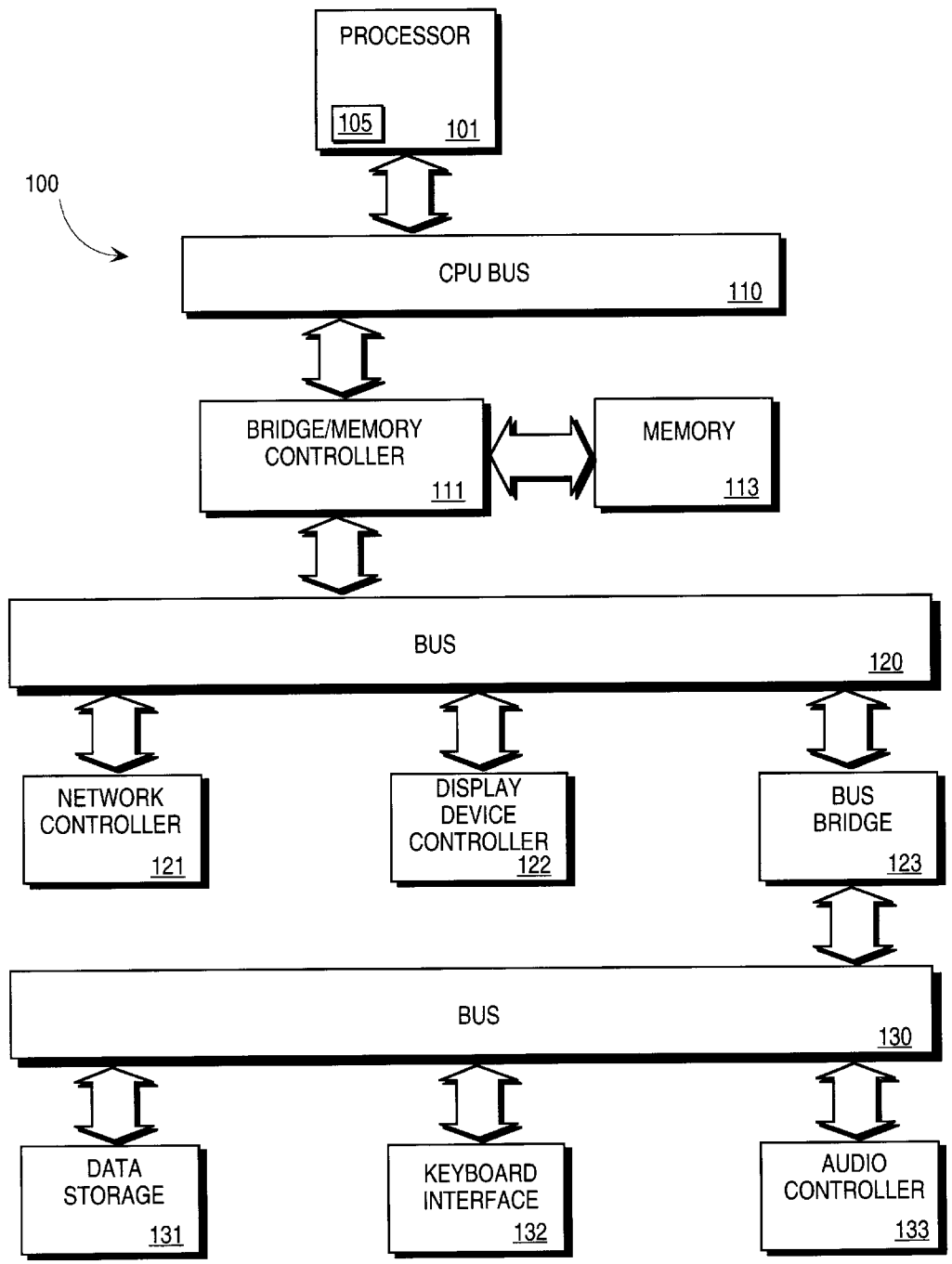
FIG. 1 illustrates a block diagram of a system implementing the present invention.

Referring to FIG. 1, a computer system upon which an embodiment of the present invention can be implemented is shown as 100. The computer system 100 comprises a processor 101 that processes digital data. The processor 101 can be a complex instruction set computing (CISC) microprocessor, a reduced instruction set computing (RISC) microprocessor, a very long instruction word (VLIW) microprocessor, a processor implementing a combination of instruction sets, or other processor device. The processor 101 is coupled to a CPU bus 110 which transmits signals between the processor 101 and other components in the computer system 100.

A scheduling unit 105 resides inside the processor 101 and operates to schedule the order in which instructions are executed in the processor 101. The scheduling unit 105 checks the data dependencies of instructions in a data stream when scheduling one instruction ahead of another. The scheduling unit 105 compares address component identifiers corresponding to a first instruction with address component identifiers corresponding to a second instruction before scheduling the first instruction ahead of the second instruction. Address component identifiers are the IDs of registers that contribute to the generation of linear addresses. The scheduling unit 105 prevents the scheduling of the first instruction ahead of the second instruction if the address component identifiers corresponding to the first and second instructions match. In one embodiment of the present invention, the first and second instructions are memory instructions in an instruction stream where the second instruction precedes the first instruction and only the address component identifiers of memory instructions are compared by the scheduling unit 105. The resulting comparison data is used by the scheduling unit 105 to generate an instruction scheduling sequence.

A memory 113 is coupled to the CPU bus 110 and comprises a dynamic random access memory (DRAM) device, a static random access memory (SRAM) device, or other memory devices. The memory 113 stores information or other intermediate data during execution by the processor 101. A bridge memory controller 111 is coupled to the CPU bus 110 and the memory 113. The bridge memory controller 111 directs data traffic between the processor 101, the memory 113, and other components in the computer system and bridges signals from these components to a high speed I/O bus 120.

The high speed I/O bus 120 supports peripherals operating at high data throughput rates. The bus 120 can be a single bus or a combination of multiple buses. As an example, the bus 120 can comprise a Peripheral Components Interconnect (PCI) bus, a Personal Computer Memory Card International Association (PCMCIA) bus or other buses. The bus 120 provides communication links between components in the computer system. A network controller 121 links a network of computers together and provides communication among the machines. A display device controller 122 is coupled to the high speed I/O bus 120. The display device controller 122 allows coupling of a display device to the computer system and acts as an interface between the display device and the computer system. The display device controller 122 can be a monochrome display adapter (MDA) card, a color graphics adapter (CGA) card, enhanced graphics adapter (EGA) card, multi-color graphics array (MCGA) card, video graphics array (VGA) card, extended graphics array (XGA) card or other display device controller. The display device can be a television set, a computer monitor, a flat panel display or other display device. The display device receives information and data from the processor 101 through the display device controller 122 and displays the information and data to the user of the computer system.

The I/O bus 130 is used for communicating information between peripheral device which operate at lower throughput rates. The I/O bus 130 can be a single bus or a combination of multiple buses. As an example, the bus 130 can comprise an Industry Standard Architecture (ISA) bus, an Extended Industry Standard Architecture (EISA) bus or a Micro Channel Architecture (MCA) bus. The bus 130 provides communication links between components in the computer system. A keyboard interface 132 can be a keyboard controller or other keyboard interface. The keyboard interface 132 can be a dedicated device or can reside in another device such as a bus controller or other controller. The keyboard interface 132 allows coupling of a keyboard to the computer system and transmits signals from a keyboard to the computer system. A data storage device 131 can be a hard disk drive, a floppy disk drive, a CD-ROM device, a flash memory device or other mass storage device. An audio controller 133 operates to coordinating the recording and playing of sounds is also coupled to I/O bus 130. A bus bridge 123 couples the high speed I/O bus 120 to the I/O bus 130. The bus bridge 123 comprises a translator to bridge signals between the high speed I/O bus 120 and the 1/O bus 130.

Figure 2:
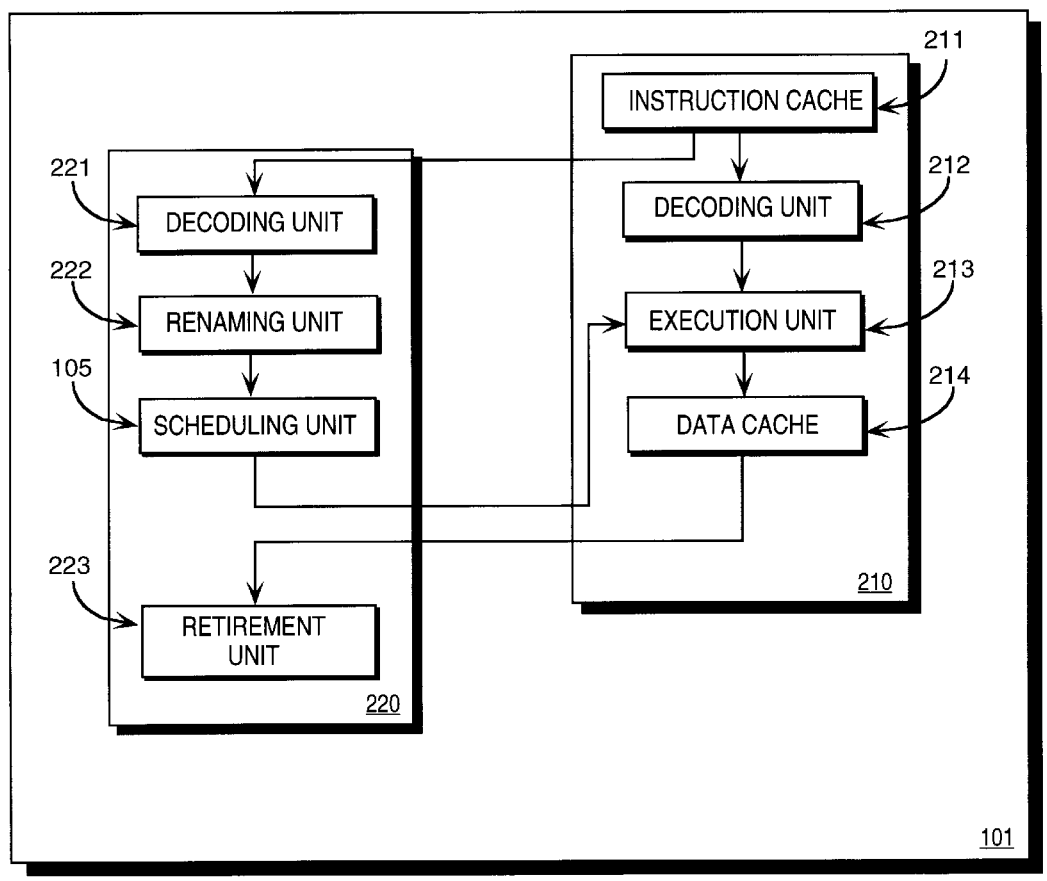
FIG. 2 illustrates a block diagram of a processor according to one embodiment of the present invention.

FIG. 2 illustrates one embodiment of the processor 101 according to the present invention. The processor 101 includes a first section 210 having an instruction cache 211, a decoding unit 212, an execution unit 213, and a data cache 214. The instruction cache 211 operates to store a plurality of instructions that are executed by the processor 101. The instructions that are stored in the instruction cache 211 may be instructions from a first or a second instruction set. Instructions from the first instruction set may be for example a RISC instruction set. Instructions from the second instruction set may be for example a CISC instruction set. Instructions from the first instruction set are sent from the instruction cache 211 to the decoding unit 212. The instruction cache 211 may be implemented by any known circuitry.

The decoding unit 212 is coupled to the instruction cache 211. The decoding unit 212 operates to decode instructions from the first instruction set to an internal format. The decoded first instruction set instructions are sent from the decoding unit 212 to the execution unit 213. The execution unit 213 is coupled to the decoding unit 212. The execution unit 213 operates to execute the decoded first instruction set instructions in the order in which they are received. The decoding unit 212 and the execution unit 213 may be implemented by any known circuitry.

The processor 105 includes a second section 220 having a decoding unit 221, a renaming unit 222, a scheduling unit 105, and a retirement unit 223. Instructions from the second instruction set are sent from the instruction cache 211 to the decoding unit 221. The decoding unit 221 operates to decode instructions from the second instruction set to micro-operations. In one embodiment of the present invention, micro-operations are instructions that perform a part of a macro-instruction from the second instruction set. The micro-operations are sent from the decoding unit 221 to the renaming unit 222. The decoding unit 221 may be implemented by any known circuitry.

The renaming unit 222 is coupled to decoding unit 221. The renaming unit 222 operates to assign new physical registers to address component identifiers which were specified as destinations by prior micro-operations. By giving the address component identifiers a new register or a "new name," the data in the registers may be operated on in parallel. Typically, an address component identifier is given a new register whenever the contents of the address component identifier is changed. Micro-operations are sent from the renaming unit 222 to the scheduling unit 105. In one embodiment of the present invention 222, renaming unit 222 operates to assign new physical registers to all instruction destinations and ensures that subsequent readers receive a correct physical copy of a logical register. A logical register is an architectural register specified by an instruction in the program. The renaming unit 222 may be implemented by any known circuitry.

The scheduling unit 105 is coupled to the renaming unit 222. The scheduling unit 105 operates to schedule the order in which instructions are executed in the processor 101. In one embodiment of the present invention, the scheduling unit 105 achieves this by scheduling the order in which micro-operations corresponding to the instructions are executed. The scheduling unit 105 re-orders micro-operations corresponding to a first instruction of a first type having priority ahead of micro-operations corresponding to a second instruction of a first type when the first instruction is not dependent on data from the second instruction. Data dependencies of non-memory instructions are expressed explicitly through the instructions' operands. The scheduling unit 105 compares the operands of the first instruction with the destination of the second instruction. If the first instruction contains operands that are dependent upon the execution of the second instruction, the first instruction is blocked from being re-ordered before the second instruction.

Data dependencies between memory instructions are not expressed explicitly through the instructions' operands. Store instructions, for example, do not produce destination address component identifiers. Thus, if a scheduler were to schedule the order of an instruction stream containing a store instruction, any data speculative instruction could be scheduled ahead of the store instruction once the sources of the data speculative instruction are ready. In order to determine whether the first instruction is dependent upon data from the second instruction, the scheduling unit 105 compares the logical address component identifiers of micro-operations corresponding to the first instruction with the second instruction. If the address component identifiers of the micro-operations corresponding to the first instruction are the same as the address component identifiers of the micro-operations corresponding to the second instruction, the scheduling unit 105 determines that the first and second instructions are accessing the same location in memory. When the first and second instructions are accessing the same location in memory, the first instruction is dependent on data from the second instruction and the first instruction is blocked from being re-ordered above the second instruction. If, however, the address component identifiers of the micro-operations corresponding to the first instruction are not the same as the address component identifiers of the micro-operations corresponding to the second instruction, the scheduling unit 105 determines that the first and second instructions are likely accessing different locations in memory. When this determination is made, the first instruction is allowed to be re-ordered ahead of the second instruction. In one embodiment of the present invention, the first instruction is a load instruction, the second instruction is a store instruction, instructions of the first type are load instructions, and instructions of the second type are store instructions.

In one embodiment of the present invention, the scheduling unit 105 schedules micro-operations corresponding to memory load and memory store instructions. Micro-operations corresponding to a memory load instruction include: 1) a logical address generation operation, 2) a load speculative advance operation, and 3) a load check operation. Micro-operations corresponding to a store instruction include: 1) a logical address generation operation and 2) a store operation. When the address component identifiers in the logical address generation operation of the load instruction and the store instruction are the same, the scheduling unit 105 schedules the store micro-operation corresponding to the store instruction ahead of the load speculative advance micro-operation corresponding to the load instruction. When the address component identifiers in the logical address generation operation of the load instruction differ from the address component identifiers in the logical address generation operation of the store instruction, the scheduling unit 105 may schedule the load speculative advance operation of the load instruction ahead of the store micro-operation of the store instruction. The address component identifiers may either be logical address component identifiers defined by a programmer or compiler or physical address component identifiers defined by the renaming unit 222. In an alternate embodiment of the present invention, address component identifiers from store operations of store instructions are compared with address component identifiers of load speculative advance operations of load instructions to determine the scheduling order of the load and store instructions.

The micro-operations are sent from the scheduling unit 105 to the execution unit 213. The execution unit 213 operates to execute the micro-operations in the order in which they are received. Data cache 214 operates to store data sent by or load data received by memory operations. Retirement unit 223 re-orders micro-operations into their original sequential order generated by the programmer and updates the architectural state in that exact order. The scheduling unit 105, the data cache 214, and the retirement unit 223 may be implemented by any known circuitry.

Figure 3:
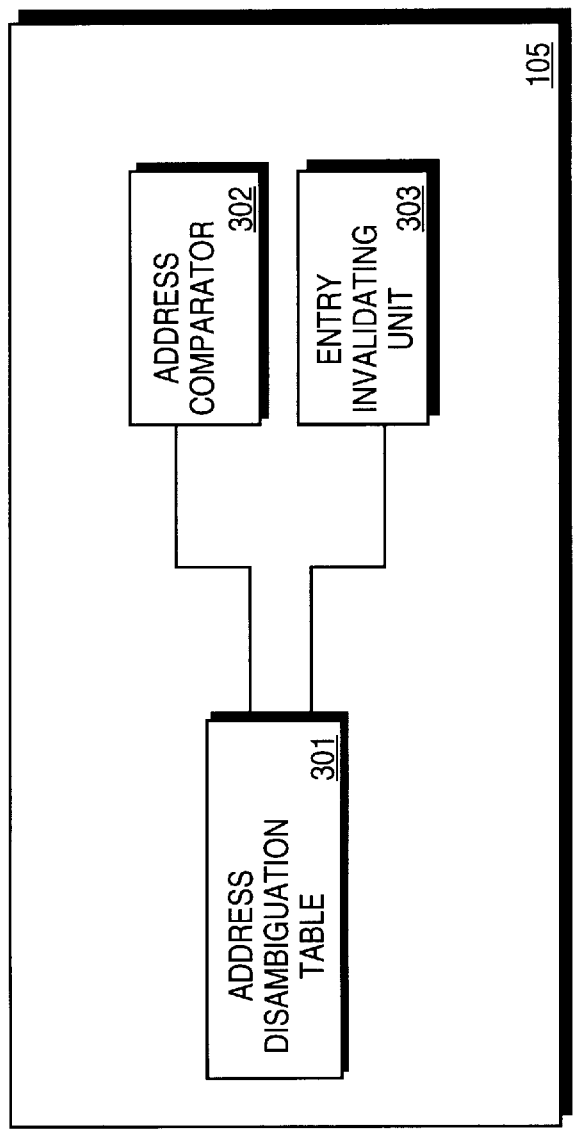
FIG. 3 illustrates a block diagram of a scheduling unit according to one embodiment of the present invention.

FIG. 3 illustrates one embodiment of the scheduling unit 105 according to one embodiment of the present invention. The scheduling unit 105 includes an address disambiguation table 301, an address comparator 302, and an entry invalidating unit 303. The address disambiguation table 301 operates to record address component identifiers of micro-operations corresponding to instructions of the second type. The address component identifiers are used to generate an address in memory which is accessed by instructions of the second type. Thus, the address disambiguation table 301 contains a listing of all the address component identifiers corresponding to instructions that the first instruction may potentially be dependent on within a specific scheduling scope. The address disambiguation table 301 can be configured to record any number of address component identifiers for any number of micro-operations.

In one embodiment of the scheduling unit 105, the address disambiguation table 301 records the segment register names, the base register names, and the displacement values of micro-operations corresponding to memory store instructions. This is illustrated in FIG. 4. The address disambiguation table 301 has columns for recording the segment register name, the base register name, and the displacement value for logical address generation operations of store instructions. The address component identifiers corresponding to each logical address generation operation recorded on the address disambiguation table 301 is referred to as an entry. In another embodiment of the present invention, address disambiguation table 301 contains a field for recording index register names of micro-operations corresponding to memory store instructions. In a preferred embodiment of the present invention, address disambiguation table 301 is coupled to multiple ports in a superscaler implementation. The superscaler implementation may process several micro-operations in parallel and allow multiple reads and writes to the address disambiguation table 301 per clock cycle. Address disambiguation table 301 may be implemented by any known circuitry.

Referring back to FIG. 3, an entry invalidating unit 303 is coupled to the address disambiguation table 301. The entry invalidating unit 303 interfaces with the renaming unit 222 (shown in FIG. 2) to receive the names of address component identifiers of micro-operations corresponding to instructions in the instruction stream between the first and second instructions which have received a new register. If an address component identifier of a micro-operation corresponding to the second instruction receives a new register, it is likely that the contents of the address component identifier have changed. A first instruction following the second instruction with the same address component identifiers is likely to generate a different address in memory. Thus, when a logical destination register identifier of a micro-operation corresponding to an instruction in the instruction stream between the first and second instructions matches an address component identifier on the address disambiguation table 301, entry invalidating unit 303 invalidates the entry containing the address component identifier. The entry invalidating unit 303 removes address component identifiers from an entry that has been invalidated from the address disambiguation table 301.

An address comparator 302 is coupled to the address disambiguation table 301. The address comparator 302 receives the address component identifiers of micro-operations corresponding to the first instruction and compares these address component identifiers with the address component identifiers recorded on the address disambiguation table 301. If the address component identifiers of micro-operations corresponding to the first instruction differ from the address component identifiers of all of the entries on the address disambiguation table 301, the scheduling unit 105 may schedule the load speculative advance micro-operation corresponding to the first instruction to be executed before the store micro-operations corresponding to all of the entries on the address disambiguation table 301. If the address component identifiers of the micro-operations corresponding to the first instruction match the address component identifiers of any of the entries on the address disambiguation table 301, the scheduling unit 105 schedules the load speculative advance micro-operation corresponding to the first instruction to be executed after the store micro-operation corresponding to the youngest matching entry. In one embodiment of the present invention, the first instruction is a load instruction and the second instruction is a store instruction and the load speculative advance operation is the only micro-operation of the first instruction that is scheduled to be executed before the second instruction.

An advance load address table resides in the first section 210 of microprocessor 101. The advance load address table stores a plurality of entries each of which have two fields, a physical address field and a physical register field. Physical addresses and physical register identifiers are written by load speculative advance operations and stored in entries in the advance load address table.

Physical addresses in store instructions are compared with the physical addresses stored in the advance load address table. If the physical address of a store instruction matches a physical address stored in the advance load address table, the entry containing the matching physical address is invalidated. In one embodiment of the present invention, a physical address comparison unit performs the comparing and the invalidating. The physical address checking unit may be implemented by any known circuitry.

Physical register identifiers written by load check operations, which like store operations are never re-ordered, are compared with the physical registers stored in the advance load address table. If the physical register identifier of a load check operation matches a physical register identifier stored in the advance load address table, it is determined that the load speculative advance instruction was not improperly scheduled ahead of a store operation. If the physical register identifier of a load check operation does not match any physical register identifier stored in the advance load address table, it is determined that an entry containing the matching physical register was invalidated by a store instruction and that the load speculative advance operation was improperly scheduled ahead of the store operation. In one embodiment of the present invention, a physical register checking unit performs the comparing and the determining. The physical register checking unit may be implemented by any known circuitry.

Figure 5:
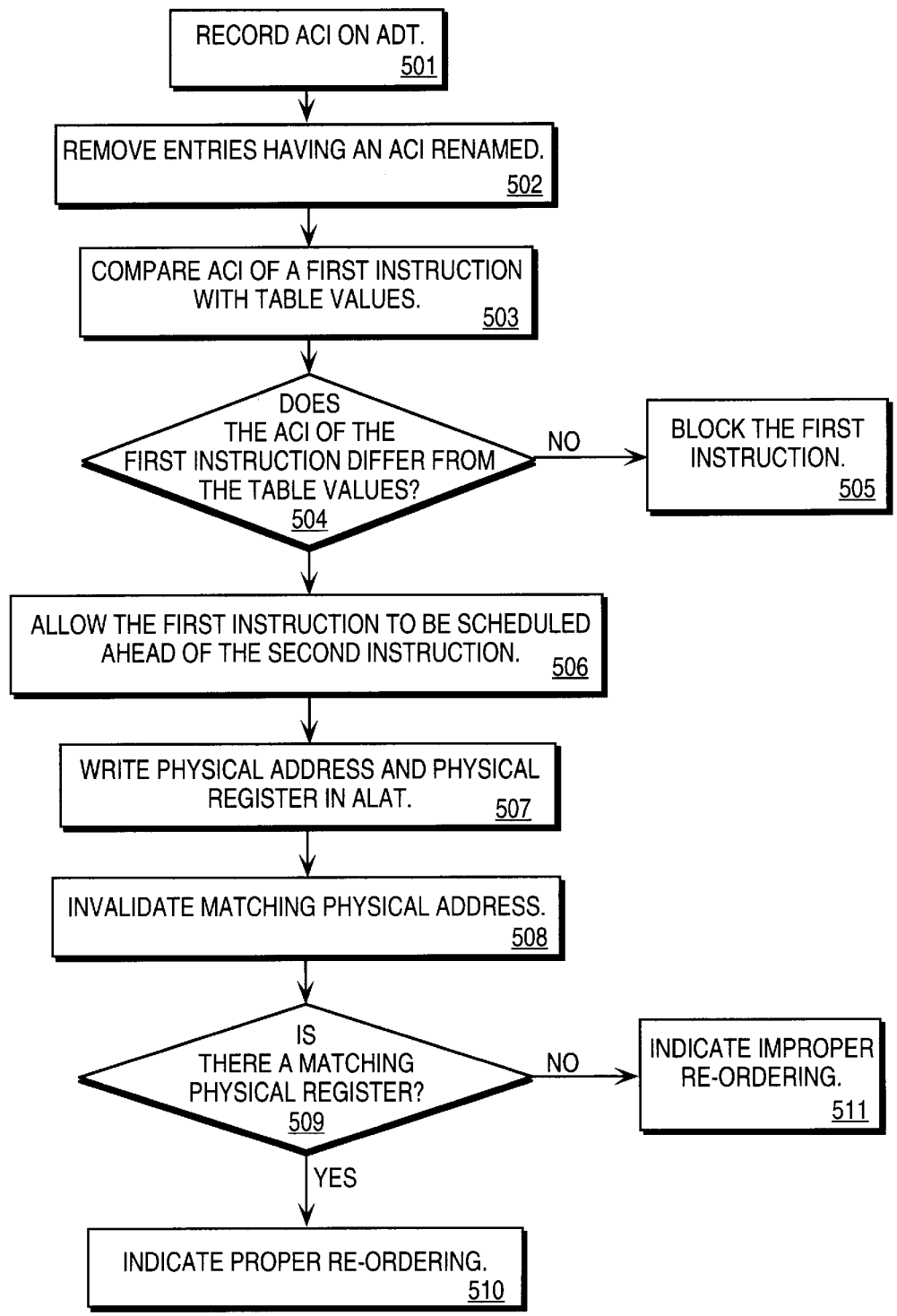
FIG. 5 is a flow chart illustrating a method of determining data dependencies between memory instructions.

FIG. 5 is a flow chart illustrating a method for determining when to execute a first instruction ahead of a second instruction in an instruction stream where the second instruction precedes the first instruction. At step 501, the address component identifiers (ACIs) corresponding to the second instruction or the ACIs of micro-operations corresponding to the second instruction are recorded on an address disambiguation table (ADT).

At step 502, entries containing an ACI assigned a new register by an instruction between the first and second instructions are removed from the ADT table.

At step 503, the ACIs corresponding to the first instruction or the ACIs of a micro-operation corresponding to the first instruction are compared with the ACIs on the ADT.

At step 504, it is determined whether the ACIs of the first instruction differ from the ACIs on the ADT. If the ACIs of the first instruction are the same as the ACIs on the ADT, control proceeds to step 505. If the ACIs of the first instruction differ from the ACIs on the ADT, control proceeds to step 506.

At step 505, the first instruction is determined to be dependent on the second instruction and is scheduled to be executed after the second instruction.

At step 506, the first instruction may be scheduled ahead of the second instruction.

At step 507, physical addresses and physical registers generated by a load speculative advance operation associated with the first instruction is written on an advance load address table (ALAT). The ALAT contains a plurality of entries having a physical address field and a physical register field.

At step 508, a physical address generated by the second instruction is compared with the physical addresses on the ALAT. If a physical address on the ALAT matches the physical address generated by the second instruction, the entry containing the matching physical address is invalidated.

At step 509, it is determined whether a physical register written by a load check operation associated with the first instruction matches any of the physical registers on the ALAT. If a matching physical register is found on the ALAT, control proceeds to step 510. If a matching physical register is not found on the ALAT, control proceeds to step 511.

At step 510, control indicates that the first instruction was not improperly re-ordered ahead of the second instruction.

At step 511, control indicates that the first instruction was improperly re-ordered ahead of the second instruction.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than an restrictive sense.

What is claimed is:

1. A scheduling unit for scheduling an execution order of a first instruction of a first type and a second instruction of a second type in an instruction stream where the second instruction precedes the first instruction, comprising:

an address disambiguation table that records address component identifiers corresponding to the second instruction; and an address comparator, coupled to the address disambiguation table, that compares address component identifiers that correspond to the first instruction with address component identifiers on the address disambiguation table, the scheduling unit scheduling the first instruction to be executed ahead of the second instruction when the address component identifiers that correspond to the first instruction differ from the address component identifiers on the address disambiguation table.

2. The scheduling unit of claim 1 further comprising an entry invalidating unit, coupled to the address disambiguation table, that invalidates an entry corresponding to the second instruction from the address disambiguation table when a register identified by the address component identifiers corresponding to the second instruction is accessed by an instruction between the first and second instructions in the instruction stream.

3. The scheduling unit of claim 1, wherein the address disambiguation table comprises a plurality of entries that store address component identifiers corresponding to a plurality of instructions of the second type in the instruction stream.

4. The scheduling unit of claim 1, wherein the table comprises fields that store a segment register name, a base register name, and a displacement value of the address component identifiers corresponding to the second instruction.

5. A computer system, comprising:

a bus;

a memory coupled to the bus;

a processor, coupled to the bus, having a scheduling unit that schedules an execution order of a first instruction of a first type and a second instruction of a second type in an instruction stream where the second instruction precedes the first instruction, including a address disambiguation table that records address component identifiers corresponding to the second instruction, and an address comparator that compares address component identifiers that correspond to the first instruction with address component identifiers on the address disambiguation table, the scheduling unit scheduling the first instruction to be executed ahead of the second instruction when the address component identifiers that correspond to the first instruction differ from the address component identifiers on the address disambiguation table.

6. The computer system of claim 5, wherein the scheduling unit further comprises an entry invalidating unit, coupled to the address disambiguation table, that invalidates an entry corresponding to the second instruction from the address disambiguation table when a register identified by the address component identifiers corresponding to the second instruction is accessed by an instruction between the first and second instructions in the instruction stream.

7. The computer system of claim 5, wherein the table comprises a plurality of entries that stores address component identifiers corresponding to a plurality of instructions of the second type in the instruction stream.

8. The computer system claim 5, wherein the address disambiguation table comprises fields that store a segment register name, a base register name, and a displacement value of the address component identifiers corresponding to the second instruction.

9. The computer system of claim 5, wherein the processor comprises an advance load address table having a plurality of entries for storing physical addresses and physical registers generated by load speculative advance operations.

10. The computer system of claim 9, wherein the processor further comprises a physical address checking unit that compares a physical address generated by a store instruction with the physical addresses on the advance load address table, wherein the physical address checking unit invalidates an entry containing a matching physical address.

11. The computer system of claim 9, wherein the processor further comprises a physical register checking unit that compares a physical register generated by a load check operation with the physical registers on the advance load address table, wherein the physical register checking unit determines that a load instruction was improperly re-ordered above a store instruction when a matching physical register is not found.

12. A method for determining when to execute a first instruction of a first type ahead of a second instruction of a second type in an instruction stream where the second instruction precedes the first instruction, comprising:

recording address component identifiers corresponding to the second instruction on a address disambiguation table;

comparing address component identifiers that corresponds to the first instruction with address component identifiers on the address disambiguation table;

executing the first instruction ahead of the second instruction if the address component identifiers corresponding to the first instruction differ from the address component identifiers on the address disambiguation table.

13. The method of claim 12, further comprising the step of invalidating an entry corresponding to the second instruction from the address disambiguation table if a register identified by the address component identifiers corresponding to the second instruction are accessed by an instruction between the first and second instructions in the instruction stream.

14. The method of claim 12, further comprising the step of recording on the table address component identifiers corresponding to all instructions of the second type in the instruction stream.

15. The method of claim 12, further comprising the steps of:

writing a physical address and a physical register generated by a load speculative advance operations on an advance load address table;

comparing a physical register generated by the second instruction with physical registers on the advance load address table; and invalidating an entry containing a matching physical register.

16. The method of claim 15, further comprising the steps of:

comparing a physical address generated by a load check operation with physical addresses on the advance load address table; and indicating that the first instruction was improperly executed ahead of the second instruction when a matching physical address is not found.

17. A method for determining when to execute a first instruction of a first type ahead of a second instruction of a second type in an instruction stream where the second instruction precedes the first instruction, comprising:

comparing address component identifiers corresponding to the first instruction with address component identifiers corresponding to the second instruction;

executing the first instruction before the second instruction if the address component identifiers corresponding to the first instruction are not the same as the address component identifiers of the second instruction.

18. The method of claim 17, further comprising the steps of:

writing a physical address and a physical register generated by a load speculative advance operations on an advance load address table;

comparing a physical register generated by the second instruction with physical registers on the advance load address table;

invalidating an entry containing a matching physical register.

19. The method of claim 18 further comprising the steps of:

comparing a physical address generated by a load check operation with physical addresses on the advance load address table; and indicating that the first instruction was improperly executed ahead of the second instruction when a matching physical address is not found.

* * * * *